Patented Mar. 3, 1953

2,630,425

UNITED STATES PATENT OFFICE 2,630,425

CURING CHLOROSULFONATED HYDROCARBON POLYMERS

Ernest A. Rodman, Newburgh, N. Y., assignor to E. I. du Pont de Nemours and Company, Wilmington, Del., a corporation of Delaware No Drawing. Application December 6, 1949, Serial No. 131,515

16 Claims. (Cl. 260—79.3)

This invention relates to synthetic elastomers, to compounding, working and curing of substantially saturated high molecular weight hydrocarbons containing a plurality of substituent groups, including sulfonyl chloride groups, and is especially directed to the elimination of scorching during the working and to the enhancement of "tightness" of cure of such polymers.

It is well known that, during the working of rubber, the outer layer of rubber is likely to be over-cured before the whole mass is vulcanized. This phenomenon is called scorching and is overcome, in accord with the art in part, at least, by the addition of substances called scorch-retarders, such, for example, as alkyd resins, glycerol phthalates, and certain metal soaps such as zinc resinate. Another aspect of this scorching phenomenon is the partial curing of "scorchy" compounds during milling or calendering whereby the compound becomes unworkable. Similar difficulties attributable to scorching have likewise been encountered during the curing of compounded synthetic elastomers.

A number of synthetic elastomers are described in the issued patents of A. McAlevy, D. E. Strain and F. S. Chance, U. S. 2,416,060 and 2,416,061. The elastomers of these patents are prepared from the halosulfonated polymers of olefines, such as ethylene, which are cured at temperatures between 25 and 300° C. under mild pressure, 50 to 500 pounds per sq. in. or more, in the presence of polyvalent metal oxides, accelerators, stabilizers, fillers and other agents added to effect the desired curing or vulcanization of the polymer. During the compounding operation, involving the incorporation by mixing and milling, generally with the application of heat, of the compounding agents, or during the further working of the resultant compound by extruding or calendering or molding, undesirable operational problems, such as scorching, occur similar to those which are encountered in the curing of rubber. Efforts have been made to inhibit or prevent the scorching by the use of rubber scorching retarders but without material success.

An object of the present invention is to provide a process of working halosulfonated hydrocarbons with compounding and curing agents under conditions that avoid scorching. Another object of the invention is to provide a process for the milling, calendering and/or embossing of chlorosulfonated hydrocarbon polymers without scorching and without the addition of so-called scorching inhibitors. Yet another object is to provide a process for the curing of chlorosulfonated hydrocarbon polymers in which the working operations, prior to curing, are conducted in the substantial absence of a hydrolyzing agent. A further object of the invention is to provide a process for the preparation of synthetic elastomer products in which moisture is incorporated in the chlorosulfonated polymer prior to, or during, the curing operation. Other objects and advantages of the invention will hereinafter appear.

In accord with its simpler aspects, the invention may be characterized as involving the curing of chlorosulfonated hydrocarbons to give products containing no scorched rejects and having a superior tightness of cure.

A critical feature of the invention resides in pretreatment of a halosulfonated hydrocarbon during and subsequent to the compounding operations but prior to the curing operations. Mixing, milling and calendering operations are conducted during this period which ordinarily involve the addition of heat, to aid in the mixing operations, and the development of heat, due to the friction of the mixing, milling and calendering operations, the attendant temperature rise is ordinarily held within limits by suitable cooling means. During this period of the process, which is considered herein as the pretreating period, scorching occurs unless the moisture content of the polymer is maintained below a certain minimum value. Scorching is detected by the observation of streaks, and/or granular patches in the product. It has been found that with bone dry compounding agents and bone dry polymer no scorching will occur during mixing, milling, calendering or extruding under the normal temperatures used during this operation which may be up to 300° F. If the moisture content of the product, however, is greater than about 0.5%, or higher, serious scorching is bound to occur.

Moisture is not the only substance found to be responsible for "scorchiness." If an agent is present that will hydrolyze the sulfonyl halide group under the conditions of working, or if an agent is present that will give off water during the mixing, milling and calendering operations, these agents likewise will give a scorched material if they are present to an extent equivalent to about 0.75% water, based on the weight of the product. The influence of all these related substances is quite similar.

Stemming from, and in contrast with the above features of the invention, is the discovery that the presence of hydrolyzing agents, and especially water, is essential to proper curing of the halosulfonated hydrocarbon polymers. Compounding formulas, curing time, temperature and other conditions being held constant, the "tightness" of the cure increases in a substantially direct ratio to the increase in hydrolyzing agent present such as water. This increase continues up to the addition of about 3% water, based on the weight of the product, and up to about 4½% on the same basis of a hydrolyzing agent. The close relationship, therefore, between the scorching and curing is quite evident for the scorching apparently is due to incipient curing during the pretreatment. Superior products, accordingly, are produced in accord with the process of this invention by conducting the pretreatment in the absence of moisture or a hydrolyzing agent and the curing in the presence of such substances. Thus no scorching difficulties are encountered during pretreatment and a product is produced having excellent properties such as high modulus, high tensile strength, good elongation and stiffness.

For optimum operation during pretreatment, the polymer, as well as the compounding agents, should be substantially bone dry and free from hydrolyzing agents, the compounded polymer being mixed, milled and calendered or extruded at temperatures ranging between 125° and 300° F. Subsequent to this pretreating operation, moisture or a hydrolyzing agent is added to the pretreated mixture. Curing may then be conducted in accord with the patented processes, or other suitable process, for example at temperatures between 200° and 300° F., the material being held at the temperature for from 0.1 to 20 hours or until the desired degree of curing has developed. In the presence of the aforesaid agents a "tightness" of cure, i. e. a high strength, tough polymer is assured; without the moisture, hydrolyzing agent, or a source of water to give the moisture, these superior products are not formed.

It is costly to provide bone dry compounding agents and bone dry chlorosulfonated hydrocarbons. The cost of preparing such materials can be avoided by reducing the moisture content to about 0.50% based on the weight of the product and if a hydrolyzing agent is used by keeping the weight of such an agent, based on the weight of the product, equivalent to about 0.75% by weight of water. Pretreatment can be successfully accomplished without material scorching with these quantities and the amount of moisture they provide, the temperatures during the pretreatment being held below about 250° F.

The ingredients that may be used during curing and which should not be used in greater amounts than indicated above during pretreatment include, for example, the hydrated metal salts, the hydrated metal oxides, the hydrated forms of aluminum sulfate, calcium sulfate, calcium chloride and calcium silicate. Organic compounds which are likewise suitable for enhancing the "tightness" of the cure include, for example, the glycols such as ethylene glycol, propylene glycol, diethylene glycol, hexamethylene glycol, pentaerythritol, sorbitol, sugars, polyvinyl alcohol and the like, the glycerols, the alkanol amines, such as the mono-, di- and triethanol amines, etc. Other hydrolyzing agents may be used such, for example, as alcohols, inorganic hydroxides, and certain chemical combinations capable of reacting to form water under curing conditions.

The effect of water in increasing the scorchiness of chlorosulfonated polymers has been determined quantitatively by the "Mooney Scorch Value" (M. S. V.) test. This test employs a standard Mooney shearing disc viscometer as used for A. S. T. M. D927–47T and determines the time taken, after closing the die of the viscometer, for a viscosity reading of 100 units to be reached, using the small rotor and temperatures of 250° F. Decreasing M. S. V. indicates increasing scorchiness.

Table I gives values obtained on a stock compounded from this formula:

FORMULA "A"

| | Parts by weight |
|---|---|
| Chlorosulfonated polythene | 100 |
| CaCO₃—dried at 110° C | 80 |
| Magnesia—dried at 110° C | 20 |
| Dipentamethylene thiuram tetrasulfide | 1 |
| Hydrogenated rosin | 2.5 |

The compounding of this formula was accomplished by milling on a 6 inch rubber mill with water cooled rolls at a temperature below 180° F. The M. S. V.'s in Table I were obtained on the dried stock to which varying amounts of water were added, the water being incorporated by soaking the compounded chlorosulfonated polythene at 50° C. until the desired weight of moisture had been absorbed.

*Table I*

| Percent Added Water (Based on whole compound) | Mooney Scorch Value (Minutes to reach reading of 100) |
|---|---|
| Dry | 60 |
| 0.16 | 22 |
| 0.55 | 13.5 |
| 3.15 | 4.5 |

From this table it will be noted that dry stock required 60 minutes to give a reading of 100 units while 0.16, 0.15 and 3.15% added water required, respectively, 22, 13.5 and 4.5 minutes to give a viscosity reading of 100 units at a temperature of 250° C. Stock containing 3.15% moisture scorches to such an extent that it cannot be successfully pretreated while stock containing 0.55% added water can be pretreated without appreciable scorching. A stock having a M. S. V. of about 12 is quite suitable although it is preferable to use stock with a M. S. V. of 15 or higher, such stock being substantially free from scorching.

In Table II the M. S. V. values are given for stock having the following composition:

FORMULA "B"

| | Parts by weight |
|---|---|
| Chlorosulfonated polythene | 100 |
| CaCO₃—dried at 110° C | 80 |
| Litharge—dried at 110° C | 40 |
| Mercaptobenothiazole | 1 |
| Wood rosin | 10 |

*Table II*

| Percent Added Water (Based on whole compound) | Mooney Scorch Value (Minutes to 100 reading) |
|---|---|
| Dry | 23 |
| 0.040 | 21 |
| 0.15 | 16.5 |
| 0.43 | 13 |

It will be noted that while the stock with no moisture gives a viscosity reading of 100 units in 23 minutes, this is reduced to about 13 minutes by 0.43% water. The latter value indicates a product which is on the borderline of scorchiness for practical processing.

It is apparent from comparison of Tables I and II that the tolerable moisture content is widely variable and may be different for different compounding formulas. The optimum moisture content to avoid scorchiness and to obtain tight cures may be readily determined, however, by using the M. S. V. test which should give a value of 10 or more minutes. One feature of the invention lies in controlling the moisture content to obtain the desired results.

The fact that increasing the water content increases the "tightness" of cure is illustrated by data in Table III. Using the stock Formula "A," a stock was prepared from dried ingredients (control) and to portions of this, various amounts of water were added by milling. The data was obtained after curing, which was accomplished by subjecting the pretreated stock to curing for 45 minutes at 125° C. and a pressure of 500 lbs. per sq. in.

*Table III*

[Conditions of cure: Press-cured 45 min., 125° C.]

| Wt.—Percent Added Water (based on compound) | Physical Properties | | | |
|---|---|---|---|---|
| | 100% Modulus, p. s. i. | Ult. Tensile, p. s. i. | Ult. Elong., Percent | Residual Elong., Percent |
| Control | 770 | 1,520 | 270 | 20 |
| 1.16 | 1,235 | 2,265 | 210 | 9 |
| 1.68 | 3,055 | 3,550 | 125 | 5 |
| 2.70 | | 3,035 | 80 | 4 |

The control containing no moisture shows very low modulus and tensile strength with a high ultimate and residual elongation. If the moisture content is increased from 1.16 to 2.70 the modulus increases rapidly as well as the tensile strength, while the ultimate elongation and residual elongation decreases.

Table IV illustrates the effect of compounds which are capable of liberating water during the curing operation and of organic compounds which are likewise suitable for enhancing the "tightness" of cure. It will be noted that these compounds are substantially as effective as water itself in giving a cure that will produce high modulus and high tensile strength elastomers.

*Table IV*

[Conditions of cure: 2 hours' oven cure at 138° C.]

| Compounding Variable | | Physical properties | | | | |
|---|---|---|---|---|---|---|
| Hydrolyzing Agent | Wt. Per Cent [1] | 100% Modulus, p. s. i. | Ult. Tensile, p. s. i. | Ult. Elong., Per Cent | Residual long., Per Cent | Stiffness, p. s. i. |
| $Al_2(SO_4)_3.18 H_2O$ | .5 | 2,600 | 3,300 | 115 | .5 | 2,150 |
| $CaSO_4.2 H_2O$ | 10 | 3,000 | 3,000 | 100 | .5 | 3,000 |
| Triethanolamine | 2 | 3,400 | 3,500 | 110 | .5 | 1,500 |
| Pentaerythritol | 2 | 2,400 | 2,850 | 110 | .5 | 1,400 |
| Ethylene Glycol | 2 | 3,000 | 3,200 | 110 | .5 | 1,850 |
| Water | .3 | | 3,100 | 65 | 0 | 3,200 |

[1] Based on whole compound.

The effect of water on the rate of cure and scorchiness of halosulfonated hydrocarbon polymers and more particularly the chlorosulfonated hydrocarbon polymers such as chlorosulfonated polymers of ethylene have been investigated in considerable detail and it has been found that, when these polymers are compounded in accord with the process described in the McAlevy et al. patents and when hydrolyzing agents and certain organic compounds are used as provided by this invention, scorching is eliminated and "tight" cures assured. The results of these tests establish that water in every instance increases the rate of cure and necessarily likewise increases the scorchiness of the stock although if the moisture content is held below the minimum values described above no scorchiness results.

While the data given describe generally the inhibition of scorching during the working and "tightness" of cure obtained during vulcanization of chlorosulfonated polymers of ethylene, the process of the invention is likewise applicable to related hydrocarbons prepared from halosulfonated, and more particularly, chlorosulfonated paraffin, polyisobutylene, rosin, asphalt, Fischer-Tropsch hydrocarbons, rubber, alkyd resins, neoprene, hydrogenated rubber, isomerized rubber, sorbitol abietate polymers, polyvinyl acetate, methyl polyacrylate, methyl polymethacrylate, polyacrylonitrile, polyvinyl chloride, polydichlorobutadiene, polyglycolides, ester gum, interpolymers of ethylene/vinyl acetate and of ethylene/CO; and polymers of butadiene-styrene, butadiene - acrylonitrile, butadiene - alkylacrylate, butadiene-alkylmethacrylate, butadiene-toluene, butadiene-xylene and other butadiene-aromatic hydrocarbon polymers.

Instead of removing the moisture by drying down to less than 0.50% based on the product present (and for optimum operation of the process the moisture content should be below that percentage), an alternate method is provided which permits pretreatment without scorching of the stock providing the moisture is bound up chemically with a water binding agent. Agents for this purpose include calcium oxide, formate esters, organic acid anhydrides and halides, $CaCl_2$, silica gel, alumina, easily hydrolyzable salts (e. g. Ca formate, Na aluminate), and $SO_3$. These chemical binding agents for the moisture should be compounded with the elastomer in such proportion that the binding agents are present in stoichiometric proportions with the moisture or at least present in sufficient proportions to reduce the effective moisture content to the minimum moisture value permissible. They should not be present in such amounts that they deleteriously influence the desirable properties of the elastomer. Some fillers of high adsorptive capacity may also be used to reduce "scorchiness." These carbon black fillers have been shown to increase the moisture tolerance, presumably via irreversible moisture adsorption. Instead of using such large amounts of the water-binding agent, moisture is preferably removed by drying the complete compound or the individual ingredients prior to compounding. Other means of suppressing the influence of moisture is accomplished by the use of lower compounding and milling temperatures but these means introduce undesirable processing restrictions.

Certain anhydrous salts which readily take up moisture then release it at elevated temperatures such, for example, as $CaCl_2$, $CaSO_4$, etc., have a unique position in the scope of this invention in that, when incorporated in compounded stocks of halosulfonated hydrocarbon polymers, they reduce the moisture content to give non-scorchy stock at the temperatures of the pre-treating operations of mixing, milling, and calendering, extruding or molding, then they release this moisture at curing temperatures to give a tightly-curing stock having superior tensile properties.

The products made in accordance with the process of this invention are useful in the forming of unsupported sheets and the coating of flexible substrates, such as e. g., flexible textile fabrics (woven and unwoven).

I claim:

1. In a process for the preparation of cured halo-sulfonated hydrocarbon polymers involving the steps of adding a polyvalent metal oxide compounding agent to the polymer, working the polymer with the compounding agents to obtain a homogeneous mixture and curing by heating the compounded and worked mixture, the step which comprises inhibiting the scorching while working the compounded polymer prior to curing at temperatures between 125 and 300° F. by maintaining the moisture content, based on the weight of the whole compound, below 0.75%.

2. In a process of working a chlorosulfonated polymer of ethylene and incorporating a polyvalent metal oxide compounding and vulcanizing agent therein followed by curing the worked and compounded polymer, the step which comprises inhibiting the scorching prior to curing of the chlorosulfonated polymer of ethylene by maintaining the moisture content, based on the weight of the whole compound, below 0.50%.

3. In a process for the preparation of a cured halosulfonated hydrocarbon polymer, the step which comprises adding a polyvalent metal oxide compounding agent and controlling the rate of cure by controlling the moisture content of the whole compound below 0.5% by weight prior to curing and above 0.5% by weight during curing.

4. In a process for the preparation of a cured halosulfonated hydrocarbon polymer involving the steps of adding a polyvalent metal oxide compounding agent to the polymer, milling the polymer and agent to obtain a homogeneous mixture and curing the compounded and worked mixture, the step which comprises maintaining the moisture content of the halosulfonated hydrocarbon polymer below 0.5% based on the weight of product, until the polymer is to be cured at which time the moisture content is increased above 0.5% on the same basis.

5. In a process for the preparation of a cured halosulfonated hydrocarbon polymer involving the steps of adding a polyvalent metal oxide compounding agent to the polymer, milling the polymer and compounding agent to obtain a homogeneous mixture and curing the compounded and milled mixture, the steps which comprise avoiding premature curing during the compounding and mixing operations by maintaining the moisture content, based on the weight of the compounded mixture, equivalent to less than 0.75% by weight of water and during the curing operation in the presence of a greater amount of water.

6. In a process for the preparation of a cured halosulfonated hydrocarbon polymer involving the steps of adding a polyvalent metal oxide compounding agent to the polymer, working the polymer and compounding agent to obtain a homogeneous mixture and curing the compounded and worked mixture, the steps which comprise controlling the moisture content to avoid undesirable curing of the compounded mixture by maintaining the moisture content during compounding and mixing below 0.75% based on the weight of compounded mixture and the moisture content during the curing operation at between 0.75% and 3% based on the weight of compounded mixture.

7. In a process for curing a non-scorched chlorosulfonated polymer of ethylene containing a polyvalent metal oxide compounding and curing agent, the step of accelerating the rate of curing by adding to the compounded and chlorosulfonated polymer of ethylene from 0.5% to 3.0% by weight moisture and heating the resulting mixture at a temperature between 25° and 300° C. under a pressure above 50 lbs./sq. inch.

8. In a process for the preparation of a cured chlorosulfonated solid polymer of ethylene, the steps which comprise compounding the polymer with from 10 to 60 parts of a polyvalent metal oxide per 100 parts of the polymer, there being present, based on the weight of compounded mixture, a moisture content equivalent to less than 0.75% by weight of water, thereafter curing the compounded mixture in the presence of a moisture content greater than 0.75% by weight of water on the same basis.

9. In a process for the preparation of a cured halosulfonated hydrocarbon polymer involving the steps of adding a polyvalent metal oxide compounding agent to the hydrocarbon polymer, working the polymer with the added agent to obtain a homogeneous mixture and curing the compounded and worked mixture, the step which comprises inhibiting scorching prior to the curing by maintaining the moisture content, based on the weight of the whole compound, below 0.75 weight per cent of water.

10. The process of claim 1 in which the moisture is supplied by a hydrated metal salt.

11. The process of claim 1 in which the moisture is supplied by a hydrated aluminum sulfate.

12. The process of claim 1 in which the moisture is supplied by a hydrated calcium sulfate.

13. The process of claim 1 in which the moisture is supplied by a hydrated calcium chloride.

14. The process of claim 1 in which the moisture is supplied by a hydrated calcium silicate.

15. In a process for the preparation of cured chlorosulfonated ethylene polymers involving the steps of adding a polyvalent metal oxide compounding agent to the polymer, working the polymer with the compounding agent to obtain a homogeneous mixture and curing by heating the compounded and worked mixture, the step which comprises inhibiting the scorching while working the compounded polymer prior to curing at temperatures between 125° and 300° F. by maintaining the moisture content, based on the weight of the whole compound, below 0.75 weight per cent of water.

16. In a process for the preparation of cured chlorosulfonated ethylene polymers involving the steps of adding polyvalent metal oxide compounding agent to the polymer, working the polymer with the compounding agent to obtain a homogeneous mixture and curing by heating the compounded and worked mixture, the step which comprises inhibiting the scorching during working by maintaining the moisture content, based on the weight of the whole compound, below 0.50% and increasing the "tightness" of the cured elastomer by maintaining the moisture content during curing, based on the weight of the whole compound, at more than 0.50%.

ERNEST A. RODMAN.

REFERENCES CITED

The following references are of record in the file of this patent:

UNITED STATES PATENTS

| Number | Name | Date |
|---|---|---|
| 2,416,061 | McAlevy | Feb. 18, 1947 |

OTHER REFERENCES

Braendle et al., Ind. Eng. Chem. 36, 724–727 (1944).

Gage: Rubber Age, pages 343–346 (December 1945).